(12) United States Patent
Vlot et al.

(10) Patent No.: US 12,345,570 B2
(45) Date of Patent: Jul. 1, 2025

(54) METHOD FOR MATCHING A COATING OF ANY GLOSS LEVEL

(71) Applicant: Akzo Nobel Coatings International B.V., Amsterdam (NL)

(72) Inventors: Margot Julia Vlot, Leiden (NL); Eric Jacob Jan Kirchner, Leiden (NL); Unnikrishnan Koodali Thazhathuveetil, Bangalore (IN)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 18/837,827

(22) PCT Filed: Feb. 21, 2023

(86) PCT No.: PCT/EP2023/054331
§ 371 (c)(1),
(2) Date: Aug. 12, 2024

(87) PCT Pub. No.: WO2023/161235
PCT Pub. Date: Aug. 31, 2023

(65) Prior Publication Data
US 2025/0027816 A1 Jan. 23, 2025

(30) Foreign Application Priority Data

Feb. 22, 2022 (IN) .............................. 202211009406
May 11, 2022 (EP) ..................................... 22172815

(51) Int. Cl.
*G01J 3/46* (2006.01)
*G01J 3/50* (2006.01)

(52) U.S. Cl.
CPC ............... *G01J 3/463* (2013.01); *G01J 3/504* (2013.01)

(58) Field of Classification Search
CPC ........... G01J 3/463; G01J 3/504; G01N 21/57
See application file for complete search history.

(56) References Cited

U.S. PATENT DOCUMENTS

2021/0270672 A1    9/2021   Tomsia

FOREIGN PATENT DOCUMENTS

| CN | 104951792 A | * | 9/2015 | .............. G01J 3/463 |
| DE | 112012004943 T5 | * | 9/2014 | ............ G01J 3/0251 |

(Continued)

OTHER PUBLICATIONS

ASTM: E2194-14 Standard Test Method for Multiangle Color Measurement of Metal Flake Pigmented Materials; ASTM Standard, 2014, pp. 1-10.

(Continued)

*Primary Examiner* — Maurice C Smith
(74) *Attorney, Agent, or Firm* — Pauly, DeVries Smith & Deffner LLC

(57) ABSTRACT

A method for matching a vehicle coating comprising a basecoat and a clearcoat comprising: providing a database including a plurality of records for different basecoats, each comprising for a combination of one basecoat with a reference clearcoat having a reference gloss value i) a set of reflectance spectra for a plurality of aspecular angles, and ii) data representative of a paint formulation corresponding to the basecoat; measuring a gloss value and a set of reflectance spectra of the vehicle coating to obtain a measured gloss value and a measured set of reflectance spectra; correcting the measured set of reflectance spectra to obtain a corrected set of reflectance spectra by using gloss correction parameters based on the measured gloss value and the reference gloss value; selecting a candidate basecoat closest matching (Continued)

the corrected reflectance spectra; and obtaining from the database a paint formulation corresponding to the selected candidate basecoat.

16 Claims, 1 Drawing Sheet

(56) References Cited

FOREIGN PATENT DOCUMENTS

| | | |
|---|---|---|
| JP | H04216422 A | 8/1992 |
| JP | H06273231 A | 9/1994 |
| WO | WO2006030028 A1 | 3/2006 |

OTHER PUBLICATIONS

European search report and search opinion in EP22172815.7.
International search report and written opinion in PCTEP2023054331.
Rodrigues A: Color technology and paint; AIC 2004 Color and Paints, Interim Meeting of the International Color Association, Proceedings; Nov. 3, 2004, pp. 103-108.

* cited by examiner

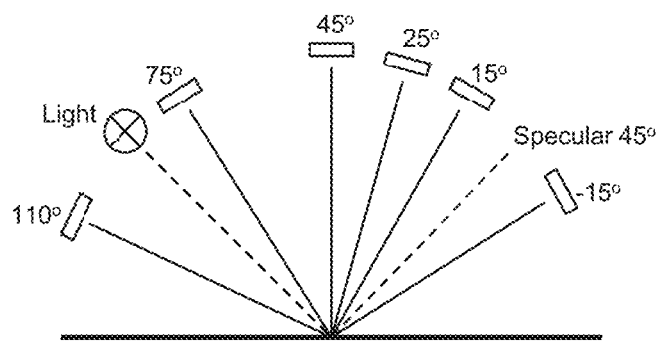

METHOD FOR MATCHING A COATING OF ANY GLOSS LEVEL

CROSS REFERENCE TO RELATED APPLICATION

This application is a 35 U.S.C. § 371 national phase application of PCT Application No. PCT/EP2023/054331 (published as WO/2023/161235), filed Feb. 21, 2023, which claims the benefit of priority to EP Application No. 202211009406, filed on May 11, 2022, and IN Application No. 202211009406, filed on Feb. 22, 2022, each of which is incorporated herein by reference in their entirety.

FIELD OF THE TECHNOLOGY

The disclosure relates to a method for matching a vehicle coating comprising a basecoat and a clearcoat, more particular wherein the clearcoat has a glossiness different from the glossiness of formulations that are available in a paint colour database.

BACKGROUND

Vehicles, such as cars, are conventionally coated with a basecoat of a solid colour or an effect colour and a substantially transparent high gloss clearcoat applied over the basecoat for providing scratch resistance and durability. A vehicle coating thus typically comprises a coloured basecoat and a transparent clearcoat. When a vehicle coating needs repair, a paint formulation that corresponds its basecoat colour is often determined by measuring a reflectance spectrum of the coating on the vehicle, and subsequently matching the measured reflectance spectrum with stored reflectance spectra in a paint colour database. The reflectance spectra stored in the database are typically based on a large dataset of various conventional solid colour basecoats and/or effect colour basecoats combined with a conventional high gloss clearcoat. Solid colour basecoats, which typically comprise light absorbing pigments, are perceived substantially the same under different aspecular angles. Effect colour basecoats on the other hand include light reflective flake pigments or particles, for example metallic and/or pearlescent pigments, and are perceived differently under different aspecular angles. Also, the clearcoat, although being substantially transparent, influences a perceived colour of the vehicle coating under different aspecular angles.

For accurate colour matching of coatings, a reflectance spectrum is therefore typically measured on the vehicle for a plurality of different aspecular angles and compared with stored reflectance spectra for these different aspecular angles in the database.

Nowadays, vehicle coatings include matte vehicle coatings, which typically include a basecoat combined with a matte clearcoat. The glossiness of such so-called matte clearcoats may vary from very matte, via semi-gloss and satin gloss to almost high gloss. Matte clearcoats lack the high glossiness of a conventional high gloss clearcoat, and, therefore, the measured and perceived colour of a matte coating may differ from a glossy coating, despite them having the same underlying basecoat. The same applies to, e.g., severely, weathered gloss clearcoats. Furthermore, the measured and perceived colour and glossiness of a vehicle coating may be strongly influenced by the type of effect colour basecoat of the coating. It is a problem that colour matching of matte coatings and effect colour coatings gives poor results when using an existing database only containing data of basecoats combined with a conventional high gloss clearcoat.

SUMMARY

It is an object to accurately match vehicle coatings. It is particularly an object to accurately match matte and effect vehicle coatings. It is particularly an object to accurately match matte and effect vehicle coatings, utilising existing databases containing records of different basecoats all combined with a high gloss clearcoat as reference clearcoat.

The disclosure provides a method for matching a vehicle coating comprising a basecoat and a clearcoat. The basecoat may include colour pigments for substantially determining a colour of the coating, and the clearcoat may include a gloss agent, e.g., a wax, or matting agent, for substantially determining a glossiness of the coating.

It has now been found that an existing database comprising records for different vehicle coatings, wherein each record is for a different basecoat combined with the same, high gloss, reference clearcoat, can be used to match a vehicle coating that has a gloss level that differs from the gloss level of the reference clearcoat.

By using gloss correction parameters that account for the difference in gloss level, a measured set of reflectance spectra of a vehicle coating can be corrected to obtain a corrected set of reflectance spectra that can be used to select a matching candidate basecoat from the database. The corrected set of reflectance spectra may thus be considered to represent a set of reflectance spectra that would have been measured in case the vehicle coating would have been as glossy as the reference clearcoat of the database.

Accordingly, the disclosure provides a method for matching a vehicle coating comprising a basecoat and a clearcoat, the method comprising:

providing a database containing a plurality of records for different basecoats, wherein each record comprises for a combination of one of the different basecoats with a reference clearcoat having a reference gloss value:

i) a set of reflectance spectra for a plurality of aspecular angles; and ii) data representative of a paint formulation corresponding to the one basecoat;

measuring a gloss value and a set of reflectance spectra for a plurality of aspecular angles of the vehicle coating to obtain a measured gloss value and a measured set of reflectance spectra;

correcting the measured set of reflectance spectra to obtain a corrected set of reflectance spectra, wherein the correcting is carried out using gloss correction parameters based on the measured gloss value and the reference gloss value of the reference clearcoat, wherein the gloss correction parameters are obtained by mapping a first dataset comprising a gloss value and a set of reflectance spectra of each of a plurality of first samples, each first sample consisting of a combination of a first sample basecoat and a first sample clearcoat having a first sample clearcoat gloss value, wherein the plurality of first samples comprises first samples of multiple first sample basecoats, wherein each first sample basecoat is combined with multiple first sample clearcoats each of the multiple first sample clearcoats having a different first sample clearcoat gloss value to a second dataset comprising a set of reflectance spectra of each of a plurality of second samples, each second sample consisting of a combination of a second sample basecoat with the reference clearcoat having the reference gloss value;

selecting a candidate basecoat matching the vehicle coating by comparing the corrected set of reflectance spectra with the sets of reflectance spectra contained in the database and selecting, as the candidate basecoat, the basecoat for which the set of reflectance spectra in the database is closest matching the corrected set of reflectance spectra; and obtaining from the database the data representative of the paint formulation corresponding to the selected candidate basecoat.

The method allows for accurate colour comparison of different basecoats, taking into account the measured gloss value of the vehicle coating and the gloss value of the reference clearcoat and applying a correction to the set of reflectance spectra measured for the vehicle coating.

It has particularly been found that for vehicle coatings comprising an effect colour basecoat, the measured gloss value of the vehicle coating can be used in the colour matching method, despite the measured gloss value being influenced by the effect pigments in the basecoat.

BRIEF DESCRIPTION OF THE DRAWINGS

FIG. 1 shows an arrangement of detection angles.

DETAILED DESCRIPTION

The method according to the disclosure comprises a step of providing a database containing a plurality of records for different basecoats, each record comprising for a combination of one of the different basecoats with a reference clearcoat having a known reference gloss value:

i) a set of reflectance spectra for a plurality of aspecular angles; and ii) data representative of a paint formulation corresponding to the one basecoat.

Hence, each record corresponds to a different basecoat combined with a reference clearcoat. The reference clearcoat is the same for all records and has a known reference gloss value. In each record a reflectance spectrum is stored for several aspecular angles. For example, each record may include a set of four, five, or six reflectance spectra of a basecoat combined with the reference clearcoat, each set for a different aspecular angle. The database may for example substantially contain records of sets of reflectance spectra corresponding to solid colour basecoats combined with a reference clearcoat. The database may contain records of sets of reflectance spectra corresponding to effect colour basecoats combined with a reference clearcoat.

The reference clearcoat may for example be a high gloss clearcoat. For example, the database may include a first record including a first set of reflectance spectra of a first basecoat combined with the reference clearcoat, and a second record including a second set of reflectance spectra of a second, different, basecoat combined with the reference clearcoat. The first and second record also comprise data representative of a liquid paint formulation corresponding to the first basecoat and second basecoat, respectively.

The term aspecular angle refers to the angle measured from the direction of direct specular reflection. Measurement at different aspecular angles can be realized by changing the direction of the detector inside and/or the light source inside a measurement device.

The method further comprises measuring a gloss value of the vehicle coating and measuring a set of reflectance spectra for a plurality of aspecular angles of the vehicle coating, to obtain a measured gloss value and a measured set of reflectance spectra.

The set of reflectance spectra includes a measured reflectance spectrum for each of a plurality of aspecular angles. A measured reflectance spectrum within the measured set of reflectance spectra includes a measured light intensity of reflected light from the vehicle coating for a range of wavelengths. One measured reflectance spectrum is a measure for the perceived colour of the vehicle coating, measured at one aspecular angle. The measured reflectance spectrum may particularly characterize a colour of the basecoat. By measuring a reflectance spectrum at a plurality of different aspecular angles, a measured set of reflectance spectra is obtained.

The plurality of aspecular angles for which reflectance spectra are measured on the vehicle coating may be the same or different aspecular angles as used in the sets of reflectance spectra recorded in the database. Preferably, the aspecular angles are the same or are at least aspecular angles used in the sets of reflectance spectra in the database (in the sense that the database may comprise further sets of reflectance spectra for further aspecular angles).

In addition to the set of reflectance spectra, the gloss value of the vehicle coating is measured. The measured gloss value may be measured at a single detection angle, e.g., an angle at or about a specular reflection angle, or at a plurality of detection angles, to obtain a measure for the perceived glossiness of the coating. Gloss may be considered as a direct reflectance of light from the clearcoat-air interface. The gloss value may accordingly characterize a degree of glossiness of the coating and may particularly be regarded as a measure for glossiness of the clearcoat.

Optionally, a further appearance property of the vehicle coating is measured, preferably a further appearance property selected from the group consisting of a lightness value, a glints value, a coarseness value, and a combination of two or more thereof.

The gloss value may be determined by any suitable means and at any suitable detection angle. Preferably, the gloss value is determined at a detection angle of 60°. The way the gloss value is determined is not critical, provided all gloss values used in the method according to the disclosure (reference gloss value, measured gloss value, gloss values of the first and second samples in the first and second datasets, first sample clearcoat gloss value) are determined in the same way and are thus comparable. The same applies for the determination of the further appearance properties specified herein, i.e., the lightness value, the glints value, and the coarseness value.

The method further comprises correcting the measured set of reflectance spectra to obtain a corrected set of reflectance spectra, wherein the correcting is carried out using gloss correction parameters based on the measured gloss value and the reference gloss value of the reference clearcoat. The gloss correction parameters are used to transform the measured set of reflectance spectra to the corrected set of reflectance spectra. This allows the vehicle coating to be compared with the records in the database, irrespective of the glossiness of the vehicle coating. The measured set of reflectance spectra may for example be corrected to account for a discrepancy between the measured gloss value of the vehicle coating and the reference gloss value. The corrected set of reflectance spectra may be regarded to represent a set of reflectance spectra of the vehicle coating as would have been measured in case the reference clearcoat would have been applied. Hence, the method allows to utilise conventional databases e.g., of high-gloss records, to match the vehicle coating based on the corrected set of reflectance spectra. The method thus obviates the need to create several new databases for various types of weathered, matte and/or effect colour coatings.

The gloss correction parameters are obtained by mapping a first dataset to a second dataset.

The first dataset comprises a gloss value and a set of reflectance spectra of each of a plurality of first samples, each first sample consisting of a combination of a first sample basecoat and a first sample clearcoat having a first sample clearcoat gloss value. The plurality of first samples comprises first samples of multiple first sample basecoats, each first sample basecoat combined with multiple first sample clearcoats, each having a different first sample clearcoat gloss value. The first samples thus include multiple groups of first samples, each group including samples wherein a particular first sample basecoat is combined with multiple first sample clearcoats of different gloss levels, and each group includes samples of a different first sample basecoat. The first samples may particularly include a solid-black first sample basecoat which is combined with multiple clearcoats of different gloss levels.

Preferably, the plurality of first samples comprises first samples of at least three first sample basecoats, more preferably at least six first sample basecoats. The upper limit of first sample basecoats is not critical, but will typically be at most 1,000, preferably at most 500, or at most 250. Preferably, the plurality of first samples comprises first samples of each first sample basecoat combined with at least three first sample clearcoats of a different first sample clearcoat gloss value, more preferably with at least six first sample clearcoats of a different first sample clearcoat gloss value. The upper limit of first sample clearcoats of a different first sample clearcoat gloss value is not critical, but will typically be at most 20, preferably at most 12.

Preferably, the plurality of first samples is at least nine first samples, more preferably at least fifteen samples. The upper limit of first samples is not critical, but will typically be at most 3,000, preferably at most 1,000.

The first dataset includes data related to appearance properties of the plurality of first samples. The data related to appearance properties at least include a gloss value and a set of reflectance spectra of each first sample. The data related to appearance properties may further include a further appearance property selected from the group consisting of a lightness value, a glints value, a coarseness value, and a combination of two or more thereof, for each first sample.

The set of reflectance spectra for each first sample comprises a reflectance spectrum for each of a plurality of aspecular angles.

The second dataset comprises a set of reflectance spectra of each of a plurality of second samples, each second sample consisting of a combination of a second sample basecoat with the reference clearcoat having the reference gloss value.

The second dataset in fact is a reference dataset including data related to appearance properties of samples of a basecoat combined with a clearcoat with the reference gloss value.

The data related to appearance properties in the second dataset at least include a set of reflectance spectra of each second sample and may further include a further appearance property selected from the group consisting of a lightness value, a glints value, a coarseness value, and a combination of two or more thereof, of each second sample.

Preferably, the first and the second dataset include the same further appearance property, if any, for the first and the second samples, respectively.

Preferably, the first sample basecoats in the plurality of first samples are the same as the second sample basecoats in the plurality of second samples. The sample basecoats may for example be a solid colour basecoat or an effect colour basecoat. The different sample basecoats may for example be of different colours. The sample basecoats may include solid colour basecoats and/or effect colour basecoats.

By mapping the first dataset to the second dataset, gloss correction parameters are obtained which, when applied to the set of reflectance spectra of the first samples, best match the set of reflectance spectra of the second samples. In fact, an influence of the glossiness of the coating on the measured set of reflectance spectra can be determined. These gloss correction parameters are used to determine the corrected set of reflectance spectra from the measured set of reflectance spectra, for the measured gloss value.

To further improve matching accuracy, the method preferably comprises measuring a further appearance property of the vehicle coating, wherein the further appearance property is selected from the group consisting of a lightness value, a glints value, a coarseness value, and a combination of two or more thereof, and the gloss correction parameters are further based on the further appearance property measured. The further basing of the gloss correction parameters on such further appearance property is done by including in the first and the second dataset the further appearance property for each of the plurality of the first and the second samples, respectively.

In one embodiment, the lightness value of the vehicle coating is measured, and the corrected set of reflectance spectra is obtained by correcting the measured set of reflectance spectra using gloss correction parameters further based on the measured lightness value. This is done by including the lightness value of the first samples in the first dataset and including the lightness value of the second samples in the second dataset. It has been found that a bright colour basecoat may have a larger contribution to the perceived gloss of a vehicle coating compared to a dark basecoat. This influence may be dependent on aspecular angle and gloss value. By further basing the correction parameters on the measured lightness value of the vehicle coating, the correction applied to the measured set of reflectance spectra may account therefor. The lightness value may be defined as a relative degree of black or white of a reflection spectrum and may for example be determined from the measured set of reflectance spectra. The lightness value may particularly be determined at an aspecular angle of between 10 and 20 degrees, such as 15 degrees. At this aspecular angle, the contribution of the basecoat to the perceived gloss is found to be the most substantial.

In one embodiment, the glints value of the vehicle coating is measured, and the corrected set of reflectance spectra is obtained by correcting the measured set of reflectance spectra using gloss correction parameters further based on the measured glints value. This is done by including the glints value of the first samples in the first dataset and including the glints value of the second samples in the second dataset. Glints may be caused by particles in the coating that provide a glittering or sparkling effect to the coating. Glints may influence the measured gloss of a coating, e.g., dependent on aspecular angle. The glints value for example includes a sparkling grade, a sparkling intensity and/or a sparkling area of a coating. It has particularly been found that a basecoat having a high glints value, such as a high sparkling intensity, may contribute to the perceived and/or measured gloss of a coating to a larger extent than a basecoat having a low glints value. This influence may be dependent on aspecular angle and gloss value. The correction applied to the set of measured reflectance spectra may account therefor. The measured glints value may particularly be measured at an aspecular angle of 20 to 30 degrees, such as at 25 degrees.

In one embodiment, the coarseness value of the vehicle coating is measured, and the corrected set of reflectance spectra is obtained by correcting the measured set of reflectance spectra using gloss correction parameters further based on the coarseness value. This is done by including the coarseness value of the first samples in the first dataset and including the coarseness value of the second samples in the second dataset. Coarseness may be regarded as a spatial brightness variation in the vehicle coating. It has been found that coarseness of a basecoat may influence perceived glossiness of the coating, and vice versa. The coarseness value may be measured under a single aspecular angle or under multiple different aspecular angles, for example corresponding to the plurality of aspecular angles at which the reflectance spectrum of the vehicle coating is measured. The coarseness value for example be a diffuse coarseness value or a graininess value. Coarseness and/or diffuse coarseness of a coating can for example be measured by obtaining images of the vehicle coating, e.g., using a camera, and determining a coarseness/diffuse coarseness value based on the images. An exemplary method for measuring a coarseness value of a coating is described in WO 2006/030028.

The mapping of the first dataset to the second dataset preferably comprises specifying a plurality of gloss ranges within a total gloss range spanning the gloss values of all first and second samples, assigning each first sample to the gloss range covering the gloss value of the first sample, and then mapping, for each gloss range, the sets of reflectance spectra of the first samples assigned to said gloss range to the sets of reflectance spectra of the second samples.

Each gloss range thus represents a predefined range of gloss values and mapping is done for each gloss range separately. Gloss correction parameters obtained by the mapping are per gloss range and might be different for each gloss range. In the correcting step of the method, the gloss correction parameters for the gloss range that covers the measured gloss value of the vehicle coating is to be used.

In case the method comprises measuring a further appearance property of the vehicle coating as described above and the gloss correction parameters are further based on such further appearance property, the mapping of the first dataset to the second dataset preferably comprises specifying for each further appearance property measured, a plurality of further appearance property value ranges within a total range spanning the values of that further appearance property of all first and second samples, and assigning each first sample to the further appearance property value range covering the value of the further appearance property of that first sample, and then mapping, for each combination of any one of the further appearance property value ranges and gloss range, the sets of reflectance spectra of the first samples assigned to that combination to the sets of reflectance spectra of the second samples.

Thus, each first sample is assigned to a range for lightness value, glints value and/or coarseness value, and to a gloss range. For each combination of ranges (lightness value range, glints values range and/or coarseness value range, and gloss range) gloss correction parameters are obtained by mapping the sets of reflectance spectra of the first samples assigned to the combination of ranges to the sets of reflectance spectra of the second samples.

Gloss correction parameters obtained by the mapping are per combination of gloss range and one or more further appearance property value ranges (lightness value range, glints value range, and/or coarseness value range) and might be different for each combination. In the correcting step of the method, the gloss correction parameters for the combination of appearance property value ranges that cover the measured values for these properties of the vehicle coating is to be used.

The gloss correction parameters for all gloss ranges, lightness value ranges, glints value ranges, coarseness value ranges and any combinations thereof may for example be stored in a table. For example, the corrected reflectance spectrum can be determined by comparing the measured gloss value to the gloss ranges and determining in which gloss range the measured gloss value would fall, comparing the measured lightness value to the lightness ranges and determining in which lightness range the measured lightness value would fall, comparing the measured coarseness value to the coarseness ranges and determining in which coarseness range the measured coarseness value would fall, and/or comparing the measured glints value to the glints value ranges and determining in which glints value range the measured glints value would fall. The gloss correction parameters used to correct the measured set of reflectance spectra are the gloss correction parameter for that gloss range, lightness range, coarseness range and/or glints value range.

Optionally, the mapping of reflectance spectra is done separately for each aspecular angle. Thus, a gloss correction parameter is obtained per aspecular angle. The measured set of reflectance spectra can then be corrected per aspecular angle, i.e., each spectrum is then corrected using a correction parameter specific for that aspecular angle.

The method then comprises separately mapping, for each aspecular angle, the reflectance spectra of the first samples to the reflectance spectra for that aspecular angle of the second samples and calculating, for each aspecular angle, for each first sample a difference reflectance spectrum between the reflectance spectrum of the first sample and the reflectance spectrum of the corresponding second sample. Reference herein to the corresponding second sample is to the second sample having a second sample basecoat that is the same as the first sample basecoat in the first sample. Preferably, the method further comprises calculating an average difference reflectance spectrum by averaging the difference reflectance spectra for all aspecular angles and calculating a gloss correction parameter by averaging the average difference reflectance spectrum for all wavelengths. The gloss correction parameter thus obtained is then used to correct the measured set of reflectance spectra.

Preferably, the separately mapping of reflectance spectra for each aspecular angle is done for each gloss range or for each combination of gloss range with one or more further appearance property value ranges as described hereinabove to obtain gloss correction parameters specific for a particular gloss range or a specific combination of gloss range and any of the further appearance property value ranges, and for a particular aspecular angle.

For example, the gloss correction parameter for a particular gloss range and for a particular aspecular angle, may be determined by mapping the first sample reflectance spectrum for that aspecular angle of first samples assigned to that gloss range to the reflectance spectrum for that aspecular angle of the corresponding second sample. The correction parameter for the particular gloss range and the particular aspecular angle is then be obtained by determining for each wavelength in the reflectance spectrum a difference, such as a percentual difference, between the first sample reflectance spectrum and the corresponding second sample reflectance spectrum, and averaging for each wavelength the difference over all first samples assigned to the gloss range.

The method further comprises selecting a candidate basecoat matching the vehicle coating by comparing the corrected set of reflectance spectra with the sets of reflectance spectra contained in the database and selecting, as the candidate basecoat, the basecoat for which the set of reflectance spectra in the database is closest matching the corrected set of reflectance spectra.

A candidate basecoat for which the set of reflectance spectra in the database is closest matching the corrected set of reflectance spectra may for example be selected by interpolation from the database. As a desired candidate basecoat is characterised by a corrected set of reflectance spectra, determining a closest matching basecoat from the database may include determining a basecoat for which on average the reflectance spectra for all aspecular angles closest match the corrected measured reflectance spectra. Alternatively, determining a closest matching basecoat from the database may include selecting a candidate basecoat for which on average the reflectance spectra for a predetermined number of aspecular angles closest match the corrected measured reflectance spectra. Alternatively, determining a closest matching candidate basecoat from the database may include selecting a candidate basecoat for which the reflectance spectra for a highest number of aspecular angles closest match the corrected measured reflectance spectra. It will be appreciated that alternative criteria may be used for determining the closest match.

Once such candidate basecoat is selected, the data representative of the paint formulation corresponding to the selected candidate basecoat are obtained from the database. The data representative of the paint formulation can e.g., be a liquid paint recipe and/or a paint reference code.

The basecoat of the vehicle coating to be matched may be an effect colour basecoat, such as a metallic, pearlescent, interference, or holographic colour basecoat. Effect colour basecoats influence the glossiness, i.e., the measured gloss value, of a coating. It has been surprisingly found that, despite this influence on the gloss value measured, the measured gloss value of a vehicle coating with an effect colour basecoat can be matched with the method as described herein. The clearcoat of the vehicle coating to be matched may be a matte clearcoat. For vehicle coatings with a matte clearcoat, the measured gloss value is typically lower than for vehicle coatings with a glossy clearcoats, particularly at a detection angle that corresponds to a specular reflection angle. The method according to the disclosure has been found to be suitable for matching vehicle coatings with a matte clearcoat.

Preferably, the measured gloss value, the measured set of reflectance spectra, and any further appearance property measured (lightness value, glints value, coarseness value) are measured for the same measurement area of the vehicle coating. More preferably, the measured gloss value, the measured set of reflectance spectra, and any further appearance property are measured simultaneously and/or consecutively using the same measurement instrument. Measuring the set of reflectance spectra, the gloss value, and any further appearance properties at different locations on the vehicle may add an additional, and unknown, location-dependency between the measurements. This is undesired. Hence, accuracy of the method can be increased by measuring the set of reflectance spectra, the gloss value, and any further appearance properties at the same measurement area of the vehicle coating.

Preferably, the method further comprises selecting a candidate clearcoat to be combined with the candidate basecoat for matching the vehicle coating. This is done by determining a desired gloss value of a clearcoat to be combined with the candidate basecoat based on the measured gloss value, and optionally the set of reflectance spectra of the candidate basecoat and/or on a lightness value of the candidate basecoat. Hence, after having determined the data representative of the paint formulation corresponding to the selected candidate basecoat, the candidate clearcoat can be selected, preferably such that the combination of the selected candidate basecoat and the candidate clearcoat have a perceived glossiness, i.e. a gloss value, that closely matches the measured gloss value. The contribution of the basecoat to the perceived gloss may be accounted for. For example, in case the selected candidate basecoat is of a light colour, e.g., having a high lightness value, the glossiness of the candidate clearcoat may be adapted, e.g., reduced, so as to obtain a coating having a gloss value that matches the measured gloss value.

Preferably, the method comprises selecting a candidate clearcoat having a gloss value closest matching the desired gloss value. The candidate clearcoat may then be provided as an existing clearcoat, for example by selected a clearcoat from a set of standard clearcoats. Alternatively, the candidate clearcoat having a gloss value closest matching the desired gloss value may be provided by mixing a first clearcoat having a low gloss value and a second clearcoat having a high gloss value in a ratio determined to result in a clearcoat with the desired gloss value. Such ratio may be determined by interpolating between standard clearcoats.

The database provided may contain one or more further records for a combination of a basecoat with a clearcoat having a gloss value other than the reference gloss value, wherein the further records comprise, as the records described hereinabove, a set of reflectance spectra for a plurality of aspecular angles, and data representative of a paint formulation corresponding to the basecoat in such further record. If the database comprises such further records and the set of reflectance spectra of such further record would closest match the corrected set of reflectance spectra (corrected towards the reference gloss value), a further correction for gloss value may be applied using the method according to the disclosure, by correcting the further record set of reflectance spectra to a further corrected set of reflectance spectra based on the gloss value of the further record. Such further correction thus corrects for any discrepancy between the gloss value of the further record and the reference gloss value.

The method according to the disclosure can suitably be carried out in a device comprising:
- a sensor for measuring a gloss value, a set of reflectance spectra, and optionally further appearance properties of the vehicle coating; and
- a processor arranged for correcting the measured set of reflectance spectra to obtain a corrected set of reflectance spectra as specified hereinabove, and for selecting from a database a candidate basecoat having a set of reflectance spectra closest matching the corrected set of reflectance spectra, and obtaining from the database the data representative of the paint formulation corresponding to the selected candidate basecoat.

It will be appreciated that any of the aspects, features and options described therein can be combined.

The disclosure will be further illustrated by means of the following nonlimiting examples.

EXAMPLES

In the examples described herein, reflectance spectra of a vehicle coating are measured under six different aspecular angles, including aspecular angles of −15°, 15°, 25°, 45°, 75° and 110°, wherein illumination is at an angle of 45° relative to the normal to the coating surface. FIG. 1 shows the arrangement of detection angles and the illumination angle at 45° resulting in the mentioned aspecular angles. Hence, a set of six reflectance spectra is measured in this example. It will be appreciated that other illumination angles and/or detection angles may be used.

Reflectance spectra can be measured by known measurement devices, such as a BYK-mac i of BYK Gardner.

Also, a gloss value of the vehicle coating is measured. The gloss value is measured at a detection angle of 60°. Gloss can for example be measured using known measurement devices, such as a Micro-TRI gloss meter or a spectro2guide of BYK Gardner.

Example 1

Table 1 shows correction parameters for a plurality of aspecular angles and for various gloss ranges that can be used to correct the measured reflectance spectra of a solid colour vehicle coating to obtain corrected reflectance spectra that can be used to select a candidate basecoat from a database. Each column represents a set of correction parameters for a particular gloss value.

The columns of table 1 correspond to a gloss values range at a detection angle of 60°, expressed in Gloss Units (GU). The Gloss Units (GU) of gloss meters is a scaling based on a highly polished reference black glass standard with a defined refractive index having a specular reflectance of 100 GU at the specified angle and 0 GU on a perfectly matt surface. In this example, the gloss value was measured using a spectro2guide of BYK Gardner. Here, the gloss value range is defined as a single gloss value. It will be appreciated that a gloss value range can be defined to extend between two gloss values. The rows of the table correspond to the plurality (six in this example) of aspecular angles at which a respective reflectance spectrum is measured.

In this example, the correction parameters are determined as a correction factor. The measured reflectance spectrum of a vehicle coating in the respective gloss range and at the respective aspecular angle has to be increased (if the correction parameter is positive) or decreased (if the correction parameter is negative) by the percentage indicated in the table to obtain the corrected reflectance spectrum at the respective aspecular angle. The correction parameter to be used is determined as follows. For each aspecular angle, a correction parameter is selected, calculated, e.g., from a function that fits the corrections, or interpolated based on the measured gloss value. For example, if the measured gloss value of a vehicle coating is 25.3 GU, the correction parameter for the aspecular angle of 25° is selected as 4%. If the measured gloss value falls between any of the listed gloss values in the table, the correction parameter associated with the nearest listed gloss value can be selected. Alternatively, if the measured gloss value falls between any of the gloss values listed in the table, the correction parameter can be interpolated, e.g., linearly interpolated. For example, the correction factors can be calculated from a continuous function of gloss value, that is fitted to the determined correction factors.

The correction parameters in the table were determined experimentally. In this example, a plurality of first samples were obtained, each first sample having a first sample basecoat combined with a first sample clearcoat of a predefined glossiness. Each first sample basecoat was combined with various first sample clearcoats having different gloss values. In the example, 18 first samples were obtained: 6 samples including a red basecoat, 6 samples including a green basecoat, and 6 samples including a blue basecoat. Each of the 6 samples of one basecoat colour was combined with a different clearcoat, i.e., a clearcoat of different glossiness. It will be appreciated that more or less samples can be used than described here.

For each first sample, a set of sample reflectance spectra was measured, each spectrum corresponding to a certain aspecular angle. Also, a sample gloss value was measured for each first sample. This first dataset of sample reflectance spectra and gloss values was mapped to a second dataset containing reflectance spectra of second samples wherein the second samples comprise the same basecoats as the first sample basecoats, but each combined with the reference clearcoat of the database.

The correction parameter for a particular gloss range and for a particular aspecular angle were obtained by determining for each wavelength in the spectrum a percentual difference between the first sample reflectance spectrum and

TABLE 1

| Solid colors | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 84% | 27% | 18% | 8% | 3% | 2% |
| Angle +15° | 51% | 17% | 16% | 1% | 1% | 0.65% |
| Angle 25° | 7% | 4% | 3% | 0.02% | 0.02% | 0.02% |
| Angle 45° | 3% | 2% | 1% | 0% | 0% | 0% |
| Angle 75° | −0.01% | −0.05% | −0.03% | 0% | 0% | 0% |
| Angle 110° | −0.2% | −0.2% | −0.1% | 0% | 0% | 0% | the second sample reflectance spectrum, and averaging for each wavelength the difference over all first samples in the gloss range. Then the correction parameters were calculated as the average percentual difference over all wavelengths of the spectrum. The reflectance spectra can for example be subdivided in several wavelength bands. The wavelength bands can e.g., be 1, 2, 5 or 10 nm wide, or any other suitable width. The correction parameter is then obtained by determining the above described difference for each wavelength band.

In this example, the difference was calculated as a percentual difference. It will be appreciated that the correction parameter can also be determined using alternative differences, such as a relative difference or an absolute difference.

Example 2

Tables 2A-2E and tables 3A-3E show examples of correction parameters for a plurality of aspecular angles that can be used to correct measured reflectance spectra of effect colour coatings to obtain corrected measured reflectance spectra.

TABLE 2A

| Effect colors L*(−15) = 80 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 47% | 31% | 21% | 12% | 0% | 0% |
| Angle +15° | 28% | 19% | 8% | 4% | 0% | 0% |
| Angle 25° | 5% | 3% | 0.3% | −0.1% | −0.1% | −0.1% |
| Angle 45° | 0.1% | 0.1% | 0% | 0% | 0% | 0% |
| Angle 75° | 0% | 0% | 0% | 0% | 0% | 0% |
| Angle 110° | 0% | 0% | 0% | 0% | 0% | 0% |

TABLE 2B

| Effect colors L*(−15) = 90 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 39% | 31% | 19% | 1% | −4% | −3% |
| Angle +15° | 24% | 15% | 8% | −2% | −3% | −1% |
| Angle 25° | 7% | 0% | 1% | −1% | −2% | −3% |
| Angle 45° | 0% | −0.1% | 0.3% | −0.2% | −0.2% | −0.2% |
| Angle 75° | 0% | 0% | 0% | 0% | 0% | 0% |
| Angle 110° | 0% | 0% | 0% | 0% | 0% | 0% |

TABLE 2C

| Effect colors L*(−15) = 100 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 28% | 24% | 9% | −3% | −7% | −14% |
| Angle +15° | 17% | 6% | −1% | −5% | −9% | −9% |
| Angle 25° | 0% | −1.5% | −2% | −3.5% | −4% | −5% |
| Angle 45° | 0.5% | 0.2% | 0% | 0% | 0% | 0% |
| Angle 75° | 0.3% | 0.2% | 0.2% | 0.2% | 0.2% | 0.2% |
| Angle 110° | 0.3% | 0.2% | 0.2% | 0.2% | 0.2% | 0.2% |

TABLE 2D

| Effect colors L*(−15) = 140 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 8% | −7% | −14% | −21% | −19% | −20% |
| Angle +15° | −3% | −5% | −8% | −10% | −12% | −15% |
| Angle 25° | 5% | 3% | 1% | 0.6% | 0.6% | 0.6% |
| Angle 45° | 3% | 2.5% | 2% | 1.5% | 1.5% | 1.5% |
| Angle 75° | 1% | 1% | 0.7% | 0.7% | 0.7% | 0.7% |
| Angle 110° | 1% | 1% | 0.7% | 0.7% | 0.7% | 0.7% |

TABLE 2E

| Effect colors L*(−15) = 170 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | −7% | −10% | −14% | −15% | −20% | −21% |
| Angle +15° | −1% | −7% | −10% | −11% | −16% | −18% |
| Angle 25° | 12% | 4% | 3% | 0.5% | 0% | −1% |
| Angle 45° | 4% | 2.4% | 2% | 1.5% | 1.5% | 1.5% |
| Angle 75° | 1% | 1% | 0.7% | 0.7% | 0.7% | 0.7% |
| Angle 110° | 1% | 1% | 0.7% | 0.7% | 0.7% | 0.7% |

TABLE 3A

| Effect colors L*(−15) = 80 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 47% | 24% | 21% | 12% | 0% | 0% |
| Angle +15° | 28% | 21% | 11% | 4% | 0% | 0% |
| Angle 25° | 5% | 3% | 0.3% | −0.1% | −0.1% | −0.1% |
| Angle 45° | 0.1% | 0.1% | 0% | 0% | 0% | 0% |
| Angle 75° | 0% | 0% | 0% | 0% | 0% | 0% |
| Angle 110° | 0% | 0% | 0% | 0% | 0% | 0% |

TABLE 3B

| Effect colors L*(−15) = 90 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 39% | 28% | 16% | 1% | −4% | −5% |
| Angle +15° | 24% | 15% | 8% | −2% | −3% | −4% |
| Angle 25° | 7% | 0% | 1% | −1% | −2% | −3% |
| Angle 45° | 0% | −0.1% | 0.3% | −0.2% | −0.2% | −0.2% |
| Angle 75° | 0% | 0% | 0% | 0% | 0% | 0% |
| Angle 110° | 0% | 0% | 0% | 0% | 0% | 0% |

TABLE 3C

| Effect colors L*(−15) = 100 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 28% | 22% | 9% | −3% | −7% | −12% |
| Angle +15° | 13% | 6% | −1% | −5% | −7% | −9% |
| Angle 25° | 0% | −1.5% | −2% | −3% | −4% | −5% |
| Angle 45° | 0.5% | 0.2% | 0% | 0% | 0% | 0% |
| Angle 75° | 0.3% | 0.2% | 0.2% | 0.2% | 0.2% | 0.2% |
| Angle 110° | 0.3% | 0.2% | 0.2% | 0.2% | 0.2% | 0.2% |

TABLE 3D

| Effect colors L*(−15) = 140 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | 8% | −7% | −10% | −18% | −19% | −20% |
| Angle +15° | −3% | −5% | −8% | −10% | −12% | −15% |
| Angle 25° | −2% | −2% | −2% | −3% | −4.5% | −7% |
| Angle 45° | −2% | −2% | 0% | 2% | 3% | 4% |
| Angle 75° | 1% | 1% | 0.7% | 0.7% | 0.7% | 0.7% |
| Angle 110° | 1% | 1% | 0.7% | 0.7% | 0.7% | 0.7% |

TABLE 3E

| Effect colors L*(−15) = 170 Glints25 > 4.5 | Gloss60 = 16 GU | Gloss60 = 25.3 GU | Gloss60 = 36.9 GU | Gloss60 = 49.5 GU | Gloss60 = 65.5 GU | Gloss60 = 82.4 GU |
|---|---|---|---|---|---|---|
| Angle −15° | −7% | −10% | −14% | −18% | −20% | −21% |
| Angle +15° | −1% | −7% | −10% | −15% | −16% | −18% |
| Angle 25° | −2% | −2% | −2% | −2% | −4.5% | −7% |
| Angle 45° | −2% | −2% | 0% | 2% | 3% | 4% |
| Angle 75° | 1% | 1% | 0.7% | 0.7% | 0.7% | 0.7% |
| Angle 110° | 1% | 1% | 0.7% | 0.7% | 0.7% | 0.7% |

Tables 2A-2E and tables 3A-3E are similar to table 1, however, each table is adapted to characteristics of the effect colour basecoat. It has been found that accuracy of matching effect colour coatings using table 1, can be increased when taking additional coating parameters, such as lightness values, glints values and coarseness values, into consideration.

It has particularly been found that effect colour basecoats, such as metallic or pearlescent colour basecoats, contribute to the measured gloss value depending on a brightness of the basecoat colour. Hence, the method, in this example, includes measuring a lightness value of the vehicle coating. In this example the CIELAB lightness L* values are used.

The lightness value in this example was measured at an aspecular angle of −15°. Multiple lightness value ranges were determined. Here, the lightness value range was defined as a single lightness value. Correction parameters for different lightness values, for different gloss values, and for different aspecular angles were determined based on a first dataset of reflectance spectra, gloss values, and lightness values in a similar way as explained with respect to table 1. The lightness value was measured at an aspecular angle of −15° and is denoted as L*(−15) in the tables. Depending on the measured lightness value, one of the tables 2A-2E, 3A-3E can be consulted for obtaining a suitable correction parameter.

To further increase the accuracy of the matching, the method in this example includes measuring a glints value of the vehicle coating. Glints in a coating provide a glittering or sparkling effect to the coating, which has been found to influence the measured gloss of a coating.

In this example the glints value corresponds to the glints impression value as measured with a BYK-mac i device. The measured glints value was measured at an aspecular angle of 25°. In this example, two glints value ranges were specified, a high glints value range and a low glints value range. A boundary glints value between "high" and "low" was set at 4.5. Appropriate example gloss correction parameters for high glints values were determined and are shown in tables 2A-2E. Gloss correction parameters for low glints values were determined and are shown in tables 3A-3E. It has been found that glints particularly contribute to the measured gloss value for relatively bright colour basecoats, at aspecular angles of 25° and 45°, and for all gloss ranges. The underlined gloss correction parameters of tables 3A-3E are accordingly the only factors that differ from the factors of tables 2A-2B.

The invention claimed is:

1. A method for matching a vehicle coating comprising a basecoat and a clearcoat, the method comprising:
   providing a database containing a plurality of records for different basecoats, wherein each record comprises for a combination of one of the different basecoats with a reference clearcoat having a reference gloss value:
   i) a set of reflectance spectra for a plurality of aspecular angles; and
   ii) data representative of a paint formulation corresponding to the one basecoat;
   measuring a gloss value and a set of reflectance spectra for a plurality of aspecular angles of the vehicle coating to obtain a measured gloss value and a measured set of reflectance spectra;
   correcting the measured set of reflectance spectra to obtain a corrected set of reflectance spectra,
   wherein the correcting is carried out using gloss correction parameters based on the measured gloss value and the reference gloss value of the reference clearcoat,
   wherein the gloss correction parameters are obtained by mapping
   a first dataset comprising a gloss value and a set of reflectance spectra of each of a plurality of first samples, each first sample consisting of a combination of a first sample basecoat and a first sample clearcoat having a first sample clearcoat gloss value, wherein the plurality of first samples comprises first samples of multiple first sample basecoats, wherein each first sample basecoat is combined with multiple first sample clearcoats each of the multiple first sample clearcoats having a different first sample clearcoat gloss value
   to
   a second dataset comprising a set of reflectance spectra of each of a plurality of second samples, each second sample consisting of a combination of a second sample basecoat with the reference clearcoat having the reference gloss value;
   selecting a candidate basecoat matching the vehicle coating by comparing the corrected set of reflectance spectra with the sets of reflectance spectra contained in the database and selecting, as the candidate basecoat, the basecoat for which the set of reflectance spectra in the database is closest matching the corrected set of reflectance spectra; and
   obtaining from the database the data representative of the paint formulation corresponding to the selected candidate basecoat.

2. The method according to claim 1, wherein the plurality of first samples comprises first samples of at least three first sample basecoats.

3. The method according to claim 1, wherein the plurality of first samples comprises first samples of each first sample basecoat combined with at least three first sample clearcoats of a different first sample clearcoat gloss value.

4. The method according to claim 1, wherein the plurality of second samples comprises second samples of at least three second sample basecoats.

5. The method according to claim 1, wherein the first sample basecoats in the plurality of first samples are the same as the second sample basecoats in the plurality of second samples.

6. The method according to claim 1, comprising measuring a further appearance property of the vehicle coating selected from the group consisting of a lightness value, a glints value, a coarseness value, and a combination of two or more thereof, and wherein the gloss correction parameters are further based on the further appearance property measured and wherein the first and the second dataset further comprise the further appearance property measured for each of the plurality of first and second samples, respectively.

7. The method according to claim 1, wherein the mapping comprises:
   specifying a plurality of gloss ranges within a total gloss range spanning the gloss values of all first and second samples, and assigning each first sample to the gloss range covering the gloss value of the first sample; and
   mapping, for each gloss range, the sets of reflectance spectra of the first samples assigned to the gloss range to the sets of reflectance spectra of the second samples.

8. The method according to claim 6, wherein the mapping comprises:
   specifying for each further appearance property measured, a plurality of further appearance property value ranges within a total range spanning the further appearance property value of all first and second samples, and assigning each first sample to the further appearance property value range covering the further appearance property value of the first sample; and
   mapping, for each combination of further appearance property value range and gloss range, the sets of reflectance spectra of the first samples assigned to the further appearance property value range and to the gloss range to the sets of reflectance spectra of the second samples.

9. The method according to claim 7, wherein the mapping comprises for each aspecular angle:
   separately mapping, for each aspecular angle, the reflectance spectra of the first samples to the reflectance spectra for the aspecular angle of the second samples and calculating, for each aspecular angle, for each first sample a difference reflectance spectrum between the reflectance spectrum of the first sample and the reflectance spectrum of the corresponding second sample.

10. The method according to claim 9, wherein the method further comprises calculating an average difference reflectance spectrum by averaging the difference reflectance spectra for all aspecular angles and calculating a gloss correction parameter by averaging the average difference reflectance spectrum for all wavelengths.

11. The method according to claim 1, wherein the basecoat of the vehicle coating is an effect colour basecoat and/or wherein the clearcoat of the vehicle coating is a matte clearcoat.

12. The method according to claim 1, wherein the gloss value, the set of reflectance spectra, and any further appearance property measured of the vehicle coating are measured for the same measurement area of the vehicle coating.

13. The method according to claim 1, further comprising selecting a candidate clearcoat to be combined with the candidate basecoat for matching the vehicle coating, wherein the candidate clearcoat has a desired gloss value and the desired gloss value is determined based on the measured gloss value.

14. The method according to claim 13, comprising providing the candidate clearcoat as an existing clearcoat having a gloss value closest matching the desired gloss value.

15. The method according to claim 13, comprising providing the candidate clearcoat by mixing a first clearcoat having a low gloss value and a second clearcoat having a high gloss value in a ratio determined to result in a clearcoat with the desired gloss value.

16. The method according to claim 13, wherein the desired gloss value is determined based on the measured gloss value and on the set of reflectance spectra of the candidate basecoat and/or a lightness value of the candidate basecoat.

* * * * *